US011057484B2

(12) United States Patent
Bleau et al.

(10) Patent No.: US 11,057,484 B2
(45) Date of Patent: *Jul. 6, 2021

(54) MESSAGE PUSH NOTIFICATION CLIENT IMPROVEMENTS FOR MULTI-USER DEVICES

(71) Applicant: Apple Inc., Cupertino, CA (US)

(72) Inventors: Darryl Neil Bleau, Campbell, CA (US); Gregory Bjorn Vaughan, Santa Cruz, CA (US); Jeffrey Thomas Davey, San Jose, CA (US)

(73) Assignee: Apple Inc., Cupertino, CA (US)

(*) Notice: Subject to any disclaimer, the term of this patent is extended or adjusted under 35 U.S.C. 154(b) by 292 days.

This patent is subject to a terminal disclaimer.

(21) Appl. No.: 14/481,677

(22) Filed: Sep. 9, 2014

(65) Prior Publication Data

US 2015/0067062 A1 Mar. 5, 2015

Related U.S. Application Data

(63) Continuation of application No. 13/080,131, filed on Apr. 5, 2011, now Pat. No. 8,924,489.

(Continued)

(51) Int. Cl.
*H04L 29/08* (2006.01)
*H04L 12/46* (2006.01)

(52) U.S. Cl.
CPC .......... *H04L 67/26* (2013.01); *H04L 12/4625* (2013.01); *H04L 67/10* (2013.01)

(58) Field of Classification Search
CPC ...... H04L 67/26; H04L 67/10; H04L 12/4625

(Continued)

(56) References Cited

U.S. PATENT DOCUMENTS 6,208,996 B1  3/2001  Ben-Shachar et al.
6,223,046 B1  4/2001  Hamill-Keays et al.
(Continued)

FOREIGN PATENT DOCUMENTS

EP        1555793 A2     7/2005
WO    WO2004/043098 A1  5/2004

OTHER PUBLICATIONS

Patterson, John F., Mark Day, and Jakov Kucan. "Notification servers for synchronous groupware." In Proceedings of the 1996 ACM conference on Computer supported cooperative work, pp. 122-129. ACM, 1996.*

(Continued)

*Primary Examiner* — Suraj M Joshi
*Assistant Examiner* — Melaku Y Habtemariam
(74) *Attorney, Agent, or Firm* — Womble Bond Dickinson (US) LLP

(57) ABSTRACT

Methods and apparatuses that generate a subtopic identifier identifying a client application within a client device that can support multiple users are described. The client application may be associated with a server application hosted in one or more application servers. Notification services may be registered with the application servers from the client application to forward identifiers associated with the client application for one of the multiple users to the server application to enable the server application to push notification messages to the client device selectively for the client application for that user. When receiving a notification message from the application server, the notification message may be examined to forward the notification message directly to the client application for that user without invoking other applications in the client device if the notification message carries a subtopic identifier of the client application.

20 Claims, 10 Drawing Sheets

Related U.S. Application Data

(60) Provisional application No. 61/430,126, filed on Jan. 5, 2011.

(58) Field of Classification Search
USPC .................................................. 709/203–207
See application file for complete search history.

(56) References Cited

U.S. PATENT DOCUMENTS

| | | | |
|---|---|---|---|
| 6,424,354 | B1 | 7/2002 | Matheny et al. |
| 6,512,930 | B2 | 1/2003 | Sandegren |
| 7,499,995 | B2 | 3/2009 | Armstrong |
| 7,617,162 | B2 * | 11/2009 | Saini .................. G06Q 30/0269 705/14.66 |
| 7,818,379 | B1 | 10/2010 | Heikes et al. |
| 7,970,823 | B2 | 6/2011 | Moeller et al. |
| 8,474,693 | B1 * | 7/2013 | Myana .................. G06Q 40/02 235/379 |
| 8,693,995 | B2 * | 4/2014 | Fisher .................. G06Q 40/02 370/338 |
| 2003/0061365 | A1 | 3/2003 | White et al. |
| 2003/0083045 | A1 | 5/2003 | Blight et al. |
| 2004/0098459 | A1 * | 5/2004 | Leukert-Knapp ..... G06F 11/327 709/206 |
| 2004/0133646 | A1 * | 7/2004 | Leukert-Knapp ..... G06F 11/327 709/206 |
| 2004/0186918 | A1 | 9/2004 | Lonnfors et al. |
| 2005/0080898 | A1 | 4/2005 | Block |
| 2005/0149620 | A1 | 7/2005 | Kirkland et al. |
| 2006/0009243 | A1 | 1/2006 | Dahan et al. |
| 2006/0218287 | A1 | 9/2006 | Dodrill et al. |
| 2007/0091010 | A1 * | 4/2007 | Richardson ........ H04N 1/00204 345/2.1 |
| 2007/0156693 | A1 * | 7/2007 | Soin ...................... G06F 21/604 |
| 2007/0204016 | A1 | 8/2007 | Kunz et al. |
| 2009/0037982 | A1 * | 2/2009 | Wentker .................. G06F 21/33 726/3 |
| 2009/0077179 | A1 * | 3/2009 | Bi ...................... H04M 1/72547 709/206 |
| 2009/0245176 | A1 | 10/2009 | Balasubramanian et al. |
| 2009/0298470 | A1 | 12/2009 | Huber et al. |
| 2009/0318172 | A1 * | 12/2009 | Vanderveen ......... G06Q 10/107 455/466 |
| 2010/0058468 | A1 | 3/2010 | Green et al. |
| 2010/0142713 | A1 | 6/2010 | Perlman |
| 2010/0161747 | A1 | 6/2010 | Rayan et al. |
| 2010/0216434 | A1 | 8/2010 | Marcellino et al. |
| 2010/0250677 | A1 * | 9/2010 | Kahan ................. H04L 12/1859 709/204 |
| 2010/0274691 | A1 | 10/2010 | Hammad et al. |
| 2010/0291898 | A1 | 11/2010 | Sanding et al. |
| 2011/0041141 | A1 | 2/2011 | Harm et al. |
| 2011/0195695 | A1 | 8/2011 | Gupta et al. |
| 2011/0289172 | A1 | 11/2011 | Marcellino |

OTHER PUBLICATIONS

European Search Report for European Patent Application No. 11611300.0 dated Jun. 5, 2014.
Bryan Sullivan et al. "Support for multi-terminal case in Push 2.2", OMA-CD-PUSH-2008, Dec. 9, 2006, pp. 1-3, XP064043710.
PCT International Preliminary Report on Patentability (Chapter 1) for correspondng International Application No. PCT/US2011/068189, dated Jul. 18, 2013, 8 pages.
PCT International Search Report and the Written Opinion of the International Searching Authority, or the Declaration, for PCT/US11/68189, dated May 1, 2012.

* cited by examiner

MESSAGE PUSH NOTIFICATION CLIENT IMPROVEMENTS FOR MULTI-USER DEVICES

RELATED APPLICATIONS

This application is a continuation of co-pending U.S. application Ser. No. 13/080,131 filed on Apr. 5, 2011, which claims the benefit of priority of prior U.S. Provisional Application Ser. No. 61/430,126, filed Jan. 5, 2011, the entirety of which is incorporated by reference.

FIELD OF THE INVENTION

The present invention relates generally to data processing systems. More particularly, this invention relates to notification messages for multi-user devices.

BACKGROUND

Users of multi-user devices (e.g., laptops, palmtops, mobile phones, smartphones, multimedia phones, portable media players, GPS units, mobile gaming systems, etc.) may have applications installed that periodically receive notification messages from notification services. For example, such applications include "push" email services (e.g., MobileMe, Microsoft Exchange ActiveSync, push-IMAP, Yahoo! Push, etc.) or other push services (e.g., update/upgrade services, news services, weblog services, podcast services, social networking services, or other types of services where notification messages may be sent). Notification messages typically represent events of interest which are typically defined by the applications (e.g., new email indicator, new news item indicator, new podcast indicator, change of online status of a social networking friend, etc.).

Usually, a notification message may be routed through a push service by identifying its corresponding originating server and receiving client device. On receiving the notification message, the client device may deliver the message to a target client application for a particular user. Often times, multiple client applications for one or more users in the client device may be waiting for notification messages from the same originating server at the same time. Each waiting client application may be invoked when the notification message arrives. As more and more server applications are hosted in the originating server for supporting ever increasing number of client applications in the client device, valuable processing resources in the client device may be wasted for managing message notification.

As such, existing mechanisms to provide message notification for multi-user devices may tax resources, do not account for multiple users on a given multi-user device, and/or pose other problems.

SUMMARY OF THE DESCRIPTION

The invention can provide multiple levels of naming hierarchies capable of addressing individual client applications and multiple users for efficiently delivering notification messages in a client multi-user device to minimize resources usage. Multiple server applications hosted in a common server identified by a server identifier or a topic can push notifications messages sharing the same topic to the client device. A subtopic can be embedded in a notification message received for the topic in the client device for identifying a target client application subscribing to the topic.

In one embodiment, a client application can optionally register a client application identifier as a subtopic in a corresponding server application running in a server identified by a topic. The subtopic may be an additional level of naming hierarchy for the client application. As a result, a notification message pushed from a server application hosted in the server can carry a token and the client application identifier to allow routing the notification message directly to the client application without invoking or notifying other client applications or other users subscribing to the shared topic. The notification server can use the token to route the message to the appropriate user account. Multiple notification messages from separate sever applications hosted by one server of a topic can be multiplexed to destined separate client applications, for the same or different users, listening to the same topic at a client device effectively and efficiently to minimize resource usage of the client device required to handle received notification messages.

In one embodiment, a method and apparatus are described herein to generate a subtopic identifier identifying a client application within a multi-user client device. The client application may be associated with a server application hosted in one or more application servers. The client application can register notification service with the application server to forward identifiers associated with the client application and enable the server application to push notification messages to the client device for that user selectively for the client application. When receiving a notification message from the application server, the notification message may be examined or inspected to be forwarded directly to the client application without invoking other applications in the client device if the notification message carries a subtopic identifier of the client application.

In another embodiment, a registration request for message notification may be received by a server application over a first network connection from a client application running in a client device. The first network connection may be established on an initiation from the client device to an application server with a server identifier to host the server application. The request may carry identifiers including a user token identifying the user and the client device and a client application identifier identifying the client application. The server identifier may be sent to the client device to allow the client device to listen to messages pushed from the application server. In one embodiment, the identifiers carried in the request may be stored to register the user for the message notification. The application server may send or push notification messages to the client device over a second network connection to a push network coupled with the client device via the user token to notify the client application. The notification messages may by identified by the server identifier. Optionally, the notification messages may carry the client application identifier to enable the client device to deliver the notification messages directly to the client application.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
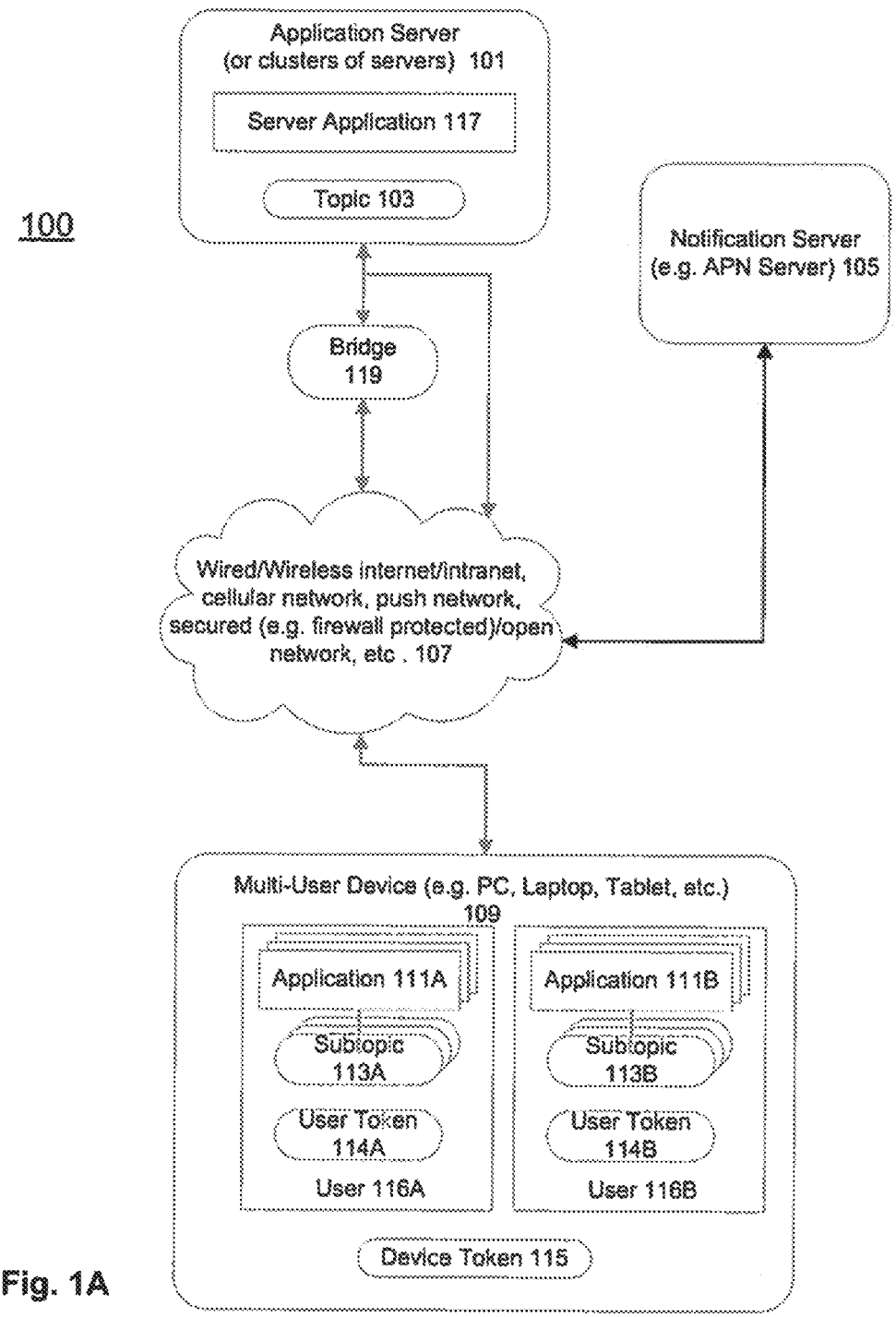
FIG. 1A is a block diagram illustrating one embodiment of networked systems for message notification.

Method and apparatus for notifications messages identifying a target client application among multiple client applications that are associated with multiple users on a multi-user device by listening or subscribing to a common application server are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone and handheld computer with a multi-touch input device.

In one embodiment, a server hosting a server application such as a mail server, an IMAP (Internet Access Message Protocol) server, a calendar server, a contact server, a device management server, or other applicable server applications, etc. can maintain push capabilities by requiring a push provider certificate from a service authority (e.g. Apple Inc.) in order to communicate notifications to client devices. A client application running, corresponding to one of a plurality of users, in a client device can query capabilities of an application server hosting a corresponding server application via a connection established from the client device to the application server. If the query result indicates the application server is push service aware or capable of providing push service, the client application can send a push service command to identify itself to the server application.

In particular, a client application running in a client device can present, via a push service command, a user token of the user and the client device to a server application to allow a server hosting the server application to push messages or notifications to the appropriate user account of the client device. In response to the push service command, the server application can identify a notification topic or an identifier for the server which the client device can listen to or watch for receiving messages pushed from the server.

In some embodiments, a push service command from a client application to a server application can include named value pairs such as a version number for a push protocol for the corresponding application, an account identifier, a user token to allow the a server (e.g. running the server application) to contact a client device for the corresponding user hosting the client application and/or a subtopic identifier identifying the client application. The account identifier and/or the subtopic identifier may remain opaque to the server to be passed to a push service (or a push server). Notification messages to the client device for the client application may carry along the account identifier and the subtopic identifier.

In one embodiment, a response to a push service command from a server application to a client application can include named values including a version number for a push protocol and a topic identifier associated with a server hosting the server application. The topic identifier may be used to register a provider certificate for the server to enable the server to push notification messages to a user account for a user of the client device running the client application. In certain embodiments, the client device and the server may perform handshake exchanges via the push service command/response, for example, to negotiate a version of the push protocol for message notification from the server application to the client application (e.g. identifying highest supported version for both the server and client applications).

According to one embodiment a subtopic for client applications may provide one or more additional levels of indirection on top of a topic associated with application servers. For example, a subtopic may direct notification messages targeting a client application. A client application can register for a topic and subtopic pair. Alternatively, a client application and an application server may not be tightly coupled via a subtopic based mechanism. Multiple (client) applications can register for a common subtopic in a topic. In addition, a client application can register a subtopic for one or more users.

A subtopic may be forwarded from a client application to a server application for registration. In certain embodiments, a subtopic or other levels of naming hierarchies may be registered for a client application for a server application without a need to forwarding the subtopic by the client application.

To illustrate, according to one embodiment, a Contact application, a Calendar application and a Word application may belong to an Office suite of applications. The Contact application may register a subtopic "contacts" under a general topic "office" for one or more users. The Calendar application may choose to register for the exact same subtopic (i.e. "contact") and topic pair (i.e. "contact" and "office") as for the Contact application in order to provide a better, more up-to-date usage experience, e.g. to add birth-days. The Word application, however, may register under the general topic "office" without registering for the subtopic "contact". Thus, registering with a subtopic may not to necessarily enforce a one-to-one mapping for (or to target) a specific application. A server may not need to know or share subtopic information with a client. For example, the server may associate a change in contact data with a specific subtopic, e.g. "contact" and use the subtopic for a push protocol as an inherent mechanism.

As another example, the Contact application registers for notifications for separate instances of each user on a multi-user device. In this example, the Contacts application can register separate notification requests for user1, user2, . . . , userN of the multi-user device. This is because user1 would want to get notifications for user1's user of the Contacts application and not notification for the Contacts application associated with user2, . . . , userN.

FIG. 1A is a block diagram illustrating one embodiment of networked systems for message notification. Networked systems 100 may include one or more servers (or hosts), such as application server 101, bridge 119, a notification server 105, e.g. APN server, coupled to one or more devices, such as multi-user device 109 (e.g. a, personal computer, laptop, table, smartphone, gaming device, etc.) via networks 107. In one embodiment, network 107 may allow network connections (e.g. for sending a push notification) between notification server 105, multi-user device 109 and/or application server 101 via the open Internet, an intranet, firewall protected secure networks, wide area cellular networks (e.g. a 3G network), etc. Networks 107 may be wired, wireless (such as Wi-Fi, Bluetooth etc), or a combination of both.

According to one embodiment, application server 101 may include one single server device or a cluster of locally or remotely distributed server devices. Application server 101 may host one or more separate server applications, such as server application 117, serving corresponding client applications running in client devices, such as multi-user device 109. Server applications may include a mail server, a calendar server, a contact server, a device management server or other applicable server applications. In one embodiment, application server 101 may register a certificate from notification server 105 to push or send notification messages to multi-user device 109. The registration may assign topic 103 as an identifier (e.g. included in a registered certificate) identifying application server 101. Multi-user device 109 may listen to topic 103 for messages originating from application server 101 via a push service, such as APN Service from Apple Inc., provided by notification server 105 for one or more of the users that have accounts on the multi-user device 109.

In one embodiment, the application server 101 transmits push notifications through a bridge 119. In one embodiment, the bridge 119 is used to convert push notifications from one format to another. In this embodiment, the bridge 119 acts as a proxy for the multi-user client 109 by receiving a push notification request from the notification server 105 and translating that push notification request into a protocol that the application server 101 can fulfill. Furthermore, the application server 101 transmits the push notifications destined for the multi-user client 109 in the native protocol used by the application server. The bridge 119 receives this push notification and translates these notifications into a format suitable for the multi-user claims (e.g., Apple Push Notification (APN) service, etc.). For example and in one embodiment, the application server 101 receives push notification requests and transmits push notifications using the extensible messaging and presence protocol (XMPP) and the multi-user client 109 receives (transmits) push notifications (push notification requests) using a different protocol (e.g., APN protocol, etc.).

In one embodiment, the bridge 119 maintains a list of users from the multi-user clients and/or single user clients that subscribe to push notifications from the application server 101. In this embodiment, the application server 101 interacts with bridge 119 as if the bridge 119 were one or more of those users. In turn, the bridge 119 interacts with the corresponding user accounts of the multi-user device 109 and/or single user clients to fulfill the push notification for the users.

In one embodiment, multi-user device 109 can host one or more user accounts 114A-B. While in one embodiment, multi-user 109 is illustrated with two user accounts, in alternate embodiments, multi-user device 109 can have less or more user accounts. In one embodiment, a user is a person who uses the multi-user device 109. The user can use the multi-user device 109 with a user account. In one embodiment, a user account is used to customize the multi-user device 109 for that user. For example and in one embodiment, a user uses a user account to create specific settings for the user's file system environment, desktop, applications, etc. In this embodiment, a user can use the user account to setup an application for a particular use by that user. For example and in one embodiment, user1 can setup a Mail application so that user1 would view e-mails for user1 and not other users.

In an alternate embodiment, for applications servers 101 that communicate in the same protocol that the multi-user client 109 uses, the application server 101 communicates push notifications without going through the bridge 119.

In one embodiment, multi-user device 109 can host multiple client applications including application 111A-B. In one embodiment, each user 114A-B can be associated with one or more applications 111A-B that can be used with the notification server 105. A client application can be a mail application, calendar application, contact application, device management application or other applicable client application, which may be served by a corresponding server application. Multi-user device 109 may register with a push service, e.g. via notification server 105, to obtain a device token 115 for enabling the multi-user device 109 to receive messages pushed from a server, such as application server 101, via the push service. Device token 115 may identify and/or certify multi-user device 109 for routing notification messages via the push service. Additionally, subtopic(s) 113A-B may be generated for each user account 114A-B instance in multi-user device 109 to uniquely identify application 111A-B among different client applications and/or users in the device. Furthermore, multi-user device 109 can request a user token 114A-B for each user 116A-B, respectively. In one embodiment, the user token 114A-B is used to uniquely identify the user 116A-B, respectively, for push notifications.

In one embodiment, application 111A-B may forward the respective user token 114A-B and the subtopic 113A-B to a corresponding server application 117 for application server 101 to push notification messages to multi-user device 109. In turn, application server 101 may reply with topic 103 for multi-user device 109 to listen for receiving notification messages pushed from application server 101. The notification messages may embed subtopic 113A-B and/or user token 114A-B to allow multi-user device 109 to directly deliver the messages to the user 116A-B and application 111A-B combination identified by subtopic 113A-B and/or user token 114A-B without invoking other client applications or notifying other user accounts in the device.

Figure 1B:
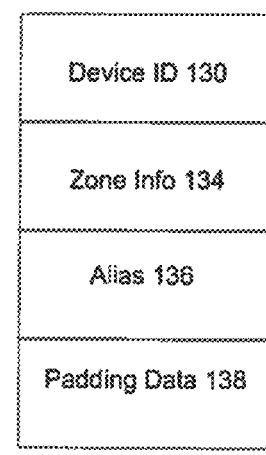
FIG. 1B is a block diagram of user token that includes an alias that is used to identify a user with a user account on a multi-user device.

FIG. 1B is a block diagram of user token 114A that includes an alias that is used to identify a user with a user account on a multi-user device. In FIG. 1B, the user token 114A includes a device identifier 130, zone information 134, the alias 136, and padding data 138. The device identifier 130 is an identifier as known in the art that is used to identify the multi-user device 109. By including the device identifier 130 in the user token 114A, the user 116A is associated with the multi-user device 109. In one embodiment, the device identifier 134 is the same identifier used in the device token 115. The device identifier can be a device certification, hardware identifier, some other device identifying data as known in the art, etc. and/or a combination therein.

In one embodiment, the zone information 134 is an identifier that associates the user 116A to a particular zone of the notification system. In one embodiment, a zone is a subdivision of the notification system, where the notification system can be made up of one or zones and each of the notification clients (e.g., multi-user device 109, other notification clients, etc.) in the same zone are handled by one or more notification servers for that zone. In one embodiment, a notification server 105 uses the zone information to forward a push notification to the appropriate notification server that is handling that zone. For example and in one embodiment, if notification server 105 processes push notifications for zone 1 and this notification server receives a push notification for zone 2 from the application server 109, notification server 105 would forward this push notification to another notification server (not illustrated) that handles push notifications for zone 2.

In addition, the user token 116A includes alias 136. In one embodiment, alias 136 is used to identify a user of the multi-user device. In this embodiment, there is a unique alias for each user and corresponding user account present on the multi-user machine 109. For example and in one embodiment, on a multi-user device, if there are two user accounts, there would be a unique alias for each of the two users. An alias 136 can a random number, an enumerated number, derived from a user certificate, etc. In one embodiment, the alias 136 is a four-byte field in the user token 116A. In one embodiment, the alias 136 is an alias of the device that is used to represent a user account and can be user in place of a device identifier for push notification.

Furthermore, the user token 116A can include padding data 138. In one embodiment, padding data 138 is data that is unimportant to the use of the token 116A and is used to fill out space inside the token 116A and/or reserve space in the token 116A for future use.

Figure 2:
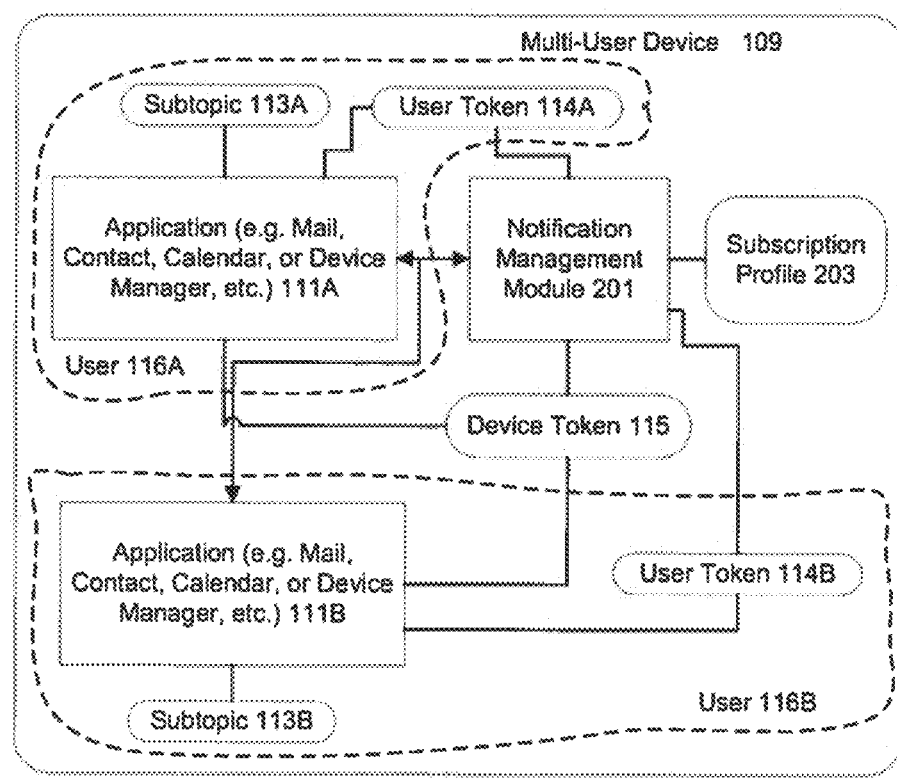
FIG. 2 is a block diagram illustrating exemplary components in a multi-user device for managing notification messages according to the embodiments described herein.

FIG. 2 is a block diagram illustrating exemplary components in a multi-user device 109 for managing notification messages according to the embodiments described herein. For example, multi-user device 109 may register for a push service via network systems 100 of FIG. 1A for multiple users 116A-B. In one embodiment, notification management module 201 may provide a framework for the push service inside multi-user device 109. Notification management module 201 may receive device token 115 during a service (e.g. push service) connection process to identify multi-user device 109 as certified or trusted to receive notification messages pushed via the push service. Furthermore, notification management module 201 may receive user tokens 114A-B during a service (e.g. push service) connection process to identify users 116A-B, respectively, as certified or trusted to receive notification messages pushed via the push service. In one embodiment, notification management module 201 may determine whether a message pushed from the push service is destined for a user 116A-B of the multi-user device 109 according to whether the message matches or includes the user token 114A-B.

According to one embodiment, notification management module 201 may generate one or more subtopics 113A-B, e.g. in response to a request from applications 111A-B, as a client application identifier identifying applications 111A-B within multi-user device 109. Applications 111A-B may forward subtopic 113A-B and the corresponding user token 114A-B to register for receiving message notification from a corresponding server application, such as sever application 117 of FIG. 1. In one embodiment, application 111A-B may subscribe or listen to a topic, such as topic 103 of FIG. 1, via notification management module 201. More than one application 111A-B in multi-user device 109 may register or subscribe to a common topic. Furthermore, the applications 111A-B that is used by different users 114A-B in multi-user device 109 may register or subscribe to a common topic. Notification management module 201 may store topic subscription data in subscription profile 203 indicating which topic is currently being subscribed by which application and which user. In one embodiment, notification management module 201 may have a different subscription profile 302 for each user token 116A-B. In this embodiment, the multi-user device 109 associates the different subscription profiles to the user 114A-B corresponding to that user token 116A-B, respectively.

On receiving a notification message pushed over a push service, notification management module 201 can extract a token from the arriving notification message to determine if the notification message is destined for multi-user device 109 based on, for example, a match between the token and the user token 116A or 116B. Notification management module 201 may identify a topic from the received notification message to identify which client applications and which user account should be notified with the received notification message according to subscription profile 203. Optionally, notification management module 201 may determine whether the received notification message carries a subtopic (e.g. a string) to deliver the received notification message directly to a client application identified by the subtopic string, such as application 111A-B identified by subtopic 113A-B, without invoking or notifying other applications also subscribing to the topic included in the received notification message.

In one embodiment, notification management module 201 may maintain whitelist and/or blacklist for each of the different users 114A-B. In this embodiment, a whitelist is a list of application identifiers corresponding to installed applications that the user of the mobile device wants to receive notification messages for. Furthermore, the blacklist is a list of application identifiers corresponding to installed applications that the user of the mobile device does not want to receive notification messages for. Maintaining and using whitelist/blacklists are described in detail in U.S. patent application Ser. No. 12/392,679, entitled "Managing Notification Messages", filed on Feb. 24, 2009 and incorporated by reference herein.

Figure 3:
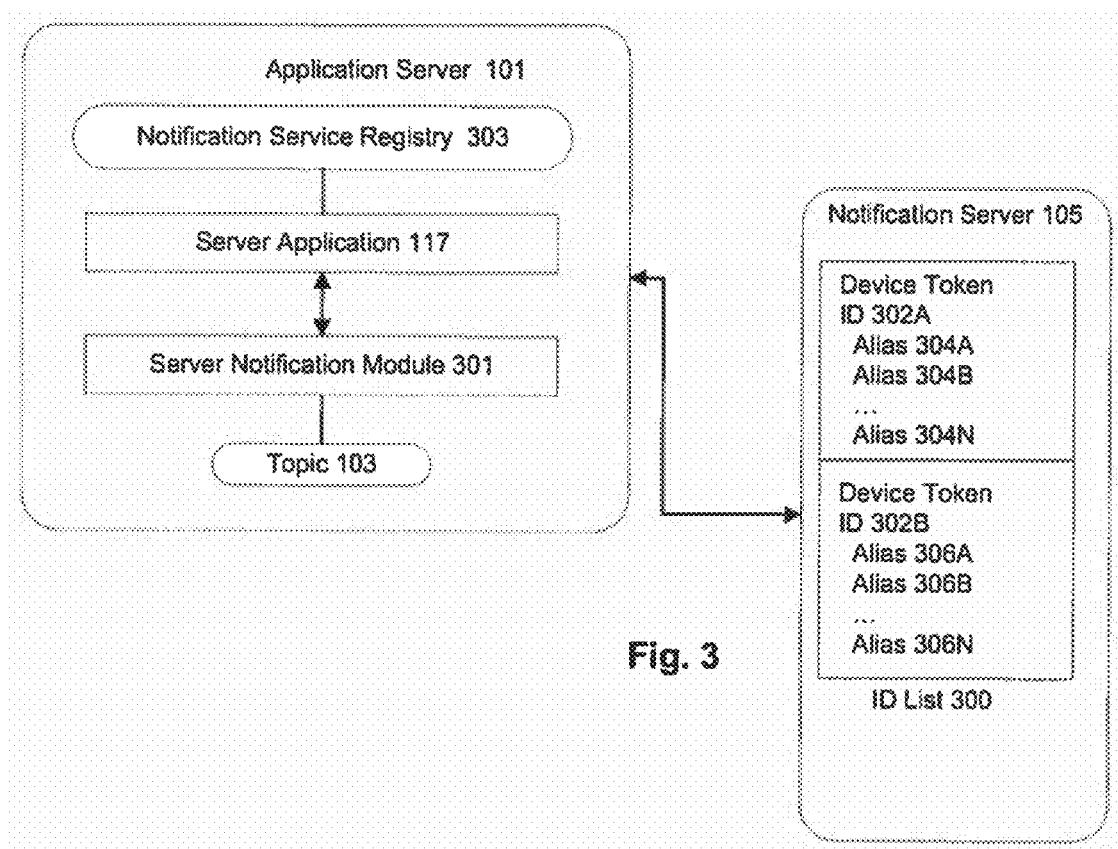
FIG. 3 is a block diagram illustrating exemplary components for an application server to provide notification messages.

FIG. 3 is a block diagram illustrating exemplary components for an application server to provide notification messages. For example, application server 101 may push notification messages to client devices via notification sever 105 over network systems 100 of FIG. 1. In one embodiment, notification module 301 may receive topic 103 to identify application server 101 as part of a certificate received from an authority of a push service. Server application 117 may pass topic 103, e.g. retrieved via notification module 301, to a client device, such as mobile client 109 of FIG. 1, to enable the client device to listen to messages pushed from application server 101.

In one embodiment, notification service registry 303 may store user tokens and associated data received from registered client devices for message notification from server application 117 or other server applications hosted in application server 101. Notification service registry 303 may be based on memory or mass storage devices locally or remotely coupled to application server 101. In one embodiment, a user token in notification service registry 303 may be associated with data such as subtopics forwarded from a client application to register for message notification. The associated data may remain opaque to application server 101 and/or notification server 105. For example, no processing resources may be allocated in application server 101 for the associated data except for storing, retrieving, removing and/or forwarding these data. When pushing a notification message to a client device identified by a user token, server application 117 may forward the user token together with its associated data and topic 103 to notification server 105, for example, via notification module 301.

To maintain the mapping between a user token and a device token, the notification server 105 maintains a list of which aliases are associated with which device. In one embodiment, notification server 105 associates multiple aliases to a device in an identifier list 300. In one embodiment, the aliases in the identifier list 300 can be alias 136 as described above in FIG. 2. For example and in one embodiment, the notification server 105 associates aliases 304A-N with device token 302A and aliases 306A-N with device token 302B. In one embodiment, notification server 105 maintains this list by processing user tokens when applications in use by different user accounts send requests to subscribe to push notifications. For example and in one embodiment, notification server 105 receives a user token that includes a device identifier when an application requests to subscribe for a push notification. In this embodiment, the notification server extracts the alias and associated device identifier from the user token and updates the identifier list 300, if needed.

Figure 4:
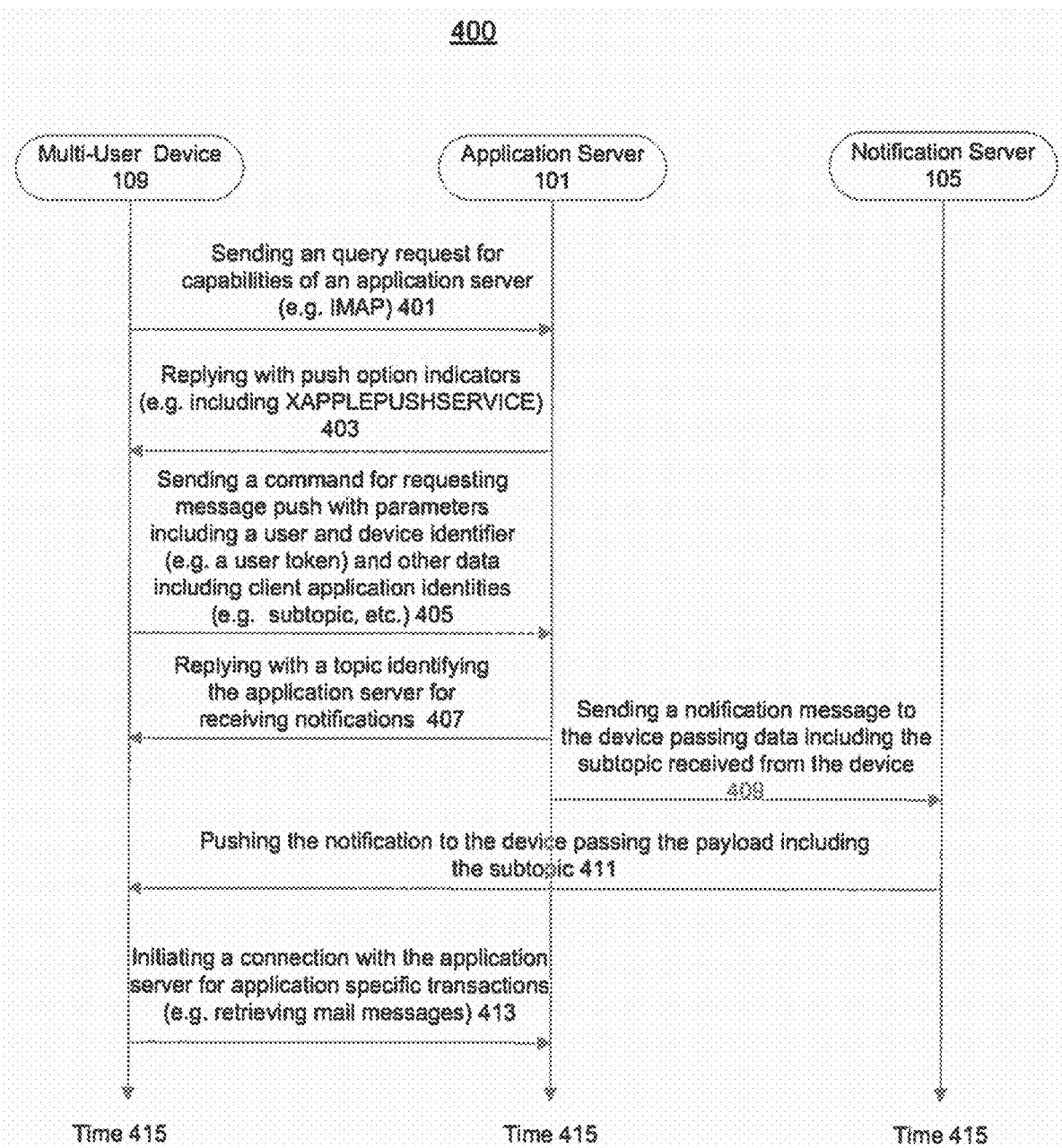
FIG. 4 is a sequence diagram illustrating exemplary message exchanges between a multi-user device and an application server according to the embodiments described herein.

FIG. 4 is a sequence diagram illustrating exemplary message exchanges between a multi-user device and an application server according to the embodiments described herein. In one embodiment, multi-user device 109, application server 101 and notification 105 may be coupled with each other via network 107 of FIG. 1. Multi-user device 109 may receive a user token, such as the user token 114A or 114B of FIG. 1, from push service, e.g. via notification server 105, prior to registering for message notification application server 101, e.g. before instance 401. Application server 101 may receive a certificate from a secure authority of a push service to authorize application server 101 to establish a connection to a push server, such as notification server 105. The certificate received may include a topic as a string, such as topic 103 of FIG. 1, for identifying application server 101.

In one embodiment, a client application, e.g. mail, of multi-user device 109 may initiate a network connection with a corresponding server application, e.g. an IMAP server, hosted in application server 101 to register for message notification from the server application. At sequence 401, the client application may initiate a network connection between multi-user device 109 and application server 101 to send a query request for inquiring which capabilities are supported by the server application. In response, at sequence 403, the server application may reply with indicators indicating availability of a push option, for example, based on a protocol including XAPPLEUSHSERVICE indicator.

In turn, at sequence 405, a client application may send a command from multi-user device 109 to application server 101 to register for message push or notification. The command may include parameters with names or identifiers to allow a server application to address multi-user device 109, user account (e.g., user token), and/or the client application. In one embodiment, the parameters may be based on named values including a user token of multi-user device 109. Optionally, the parameters may include a subtopic, e.g. "com.apple.mobilemail", uniquely owned by the client application within multi-user device 109. At sequence 407, an application server may reply with a topic identifying application server 101. A topic may be a string, e.g. "com.google.push", which can be used to identify messages pushed from application server 101 via a push service shared by multiple servers. Additional application specific transactions may be exchanged over the same network connection established for registering message notification between multi-user device 109 and application server 101. This network connection may be disconnected while multi-user device 109 is waiting for notifications from application server 101.

Subsequently, a server application may generate a notification message to be pushed to multi-user device 109, e.g. in response to occurrences of certain application specific events, such as the arrival of new mails in an IMAP server for a particular user. The server application may package the notification messages with a user token and passing data associated with the user token, for example, including a subtopic of a client application registered (or stored) for multi-user device 109. At sequence 409, application server 101 may send the notification message with a topic identifying the application server 101 via notification server 105 to multi-user device 109. In turn, at sequence 411, notification server 105 may push the notification message to multi-user device 109 via a push network service.

On the arrival of a notification message, multi-user device 109 may verify a topic and/or a user token of the message before forwarding the message to interested client applications and user account. Multi-user device 109 may ignore the message if the verification fails (e.g. the topic is not subscribed and/or the user token does not match a local user token). Optionally, multi-user device 109 may extract a subtopic from a payload of the notification message to deliver the notification message only to the client application named by the subtopic without forwarding to other applications subscribing to the topic. Multi-user device 109 may invoke the client application for that user account if the client application is in a sleep state or not currently running to receive the notification message. In turn, at sequence 413, the client application may initiation a connection with a corresponding server application in application server 101 to perform application specific transactions (e.g. retrieving mail messages for corresponding user).

Figure 5A:
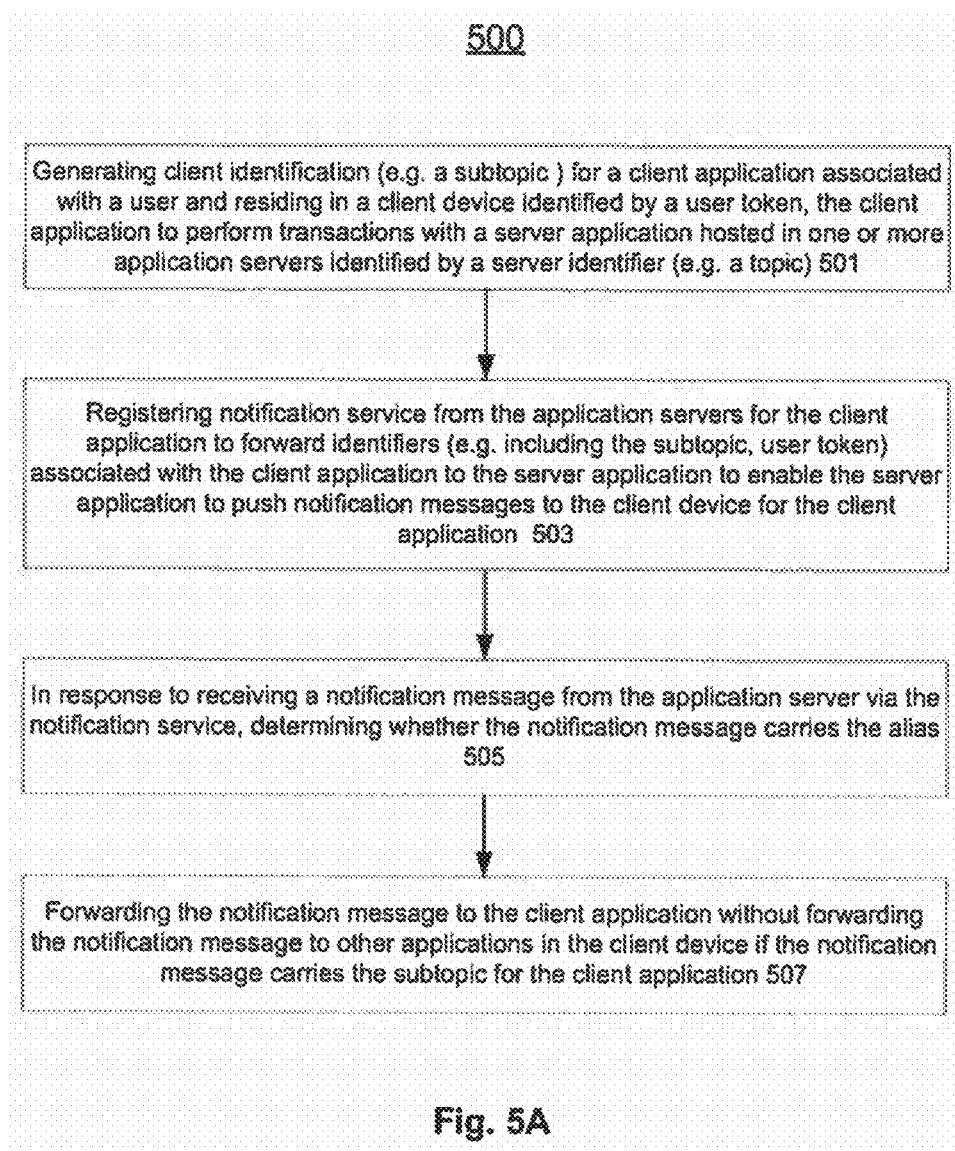
FIG. 5A is a flow diagram illustrating one embodiment of a process to enable a multi-user device to mute a notification message to an identified client application.

FIG. 5A is a flow diagram illustrating one embodiment of a process 500 to enable a multi-user device to route a notification message to an identified client application. Exemplary process 500 may be performed by a processing logic that may comprise hardware (circuitry, dedicated logic, etc.), software (such as is run on a dedicated machine), or a combination of both. For example, process 500 may be performed by some components of system 100 of FIG. 1. At block 501, the processing logic of process 500 can generate an application identifier (e.g. a subtopic) for a client application residing in a client device identified by a user token, the client application to perform transactions with a server application hosted by one or more application servers identified by a server identifier (e.g. a topic).

At block 503, in one embodiment, the processing logic of process 500 may register message notification service from application servers for a client application. The processing logic of process 500 may forward identifiers (e.g. including a subtopic for the client application identifier and a user token for a user of the client device) associated with the client application to a server application hosted in the application servers to enable the server application to push notification messages to the client device for the client application and the corresponding user.

At block 505, in response to receiving a notification message from an application server, the processing logic of process 500 may determine whether the notification message carries an application identifier. In one embodiment, the processing logic of process 500 may extract a token and a topic (e.g. based on named values) from the notification message to verify if the notification message is intended to be received by a multi-user device. In one embodiment, the processing logic of process 500 may identify the application identifier, e.g. a subtopic, from a payload of the notification message.

If an application identifier or a subtopic and the alias in the user token is identified, at block 507, the processing logic of process 500 may forward the notification message to a client application identified by the subtopic for the user identified by the alias without forwarding the notification message to other applications subscribing to a topic or other users (whether those users use the client application or not) of the notification message. The processing logic of process 500 may select the client application identified by the subtopic among multiple client applications and select the client application for the appropriate user subscribing to the topic in a client device. Otherwise, if no subtopic is found in the notification message, the processing logic of process 500 may forward the notification message to each client application subscribing to the topic for the client application and/or to each user to determine whether to process the notification message (e.g. based on content carried in the message).

Figure 5B:
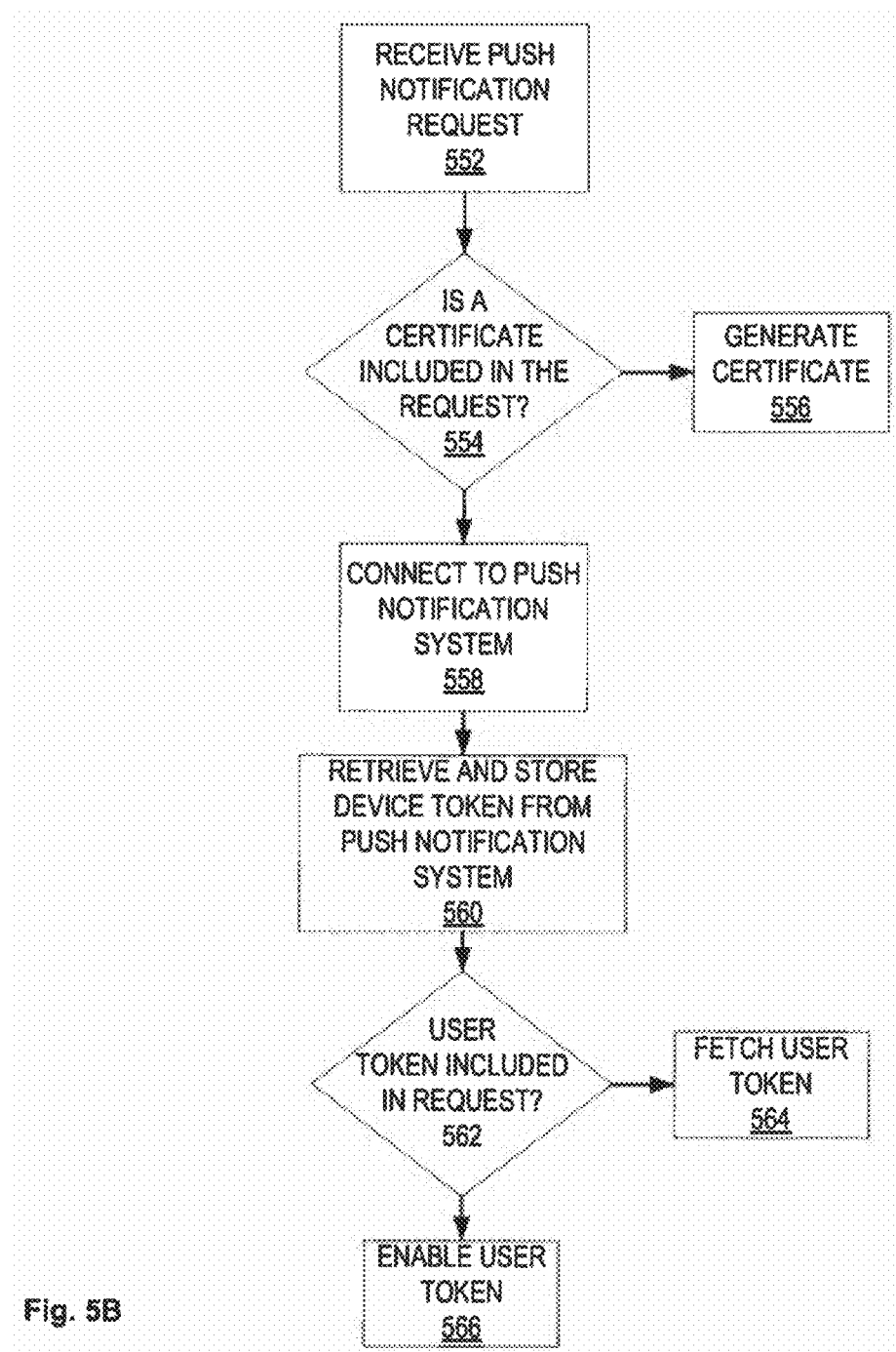
FIG. 5B is a flow diagram illustrating one embodiment of a process to generate a user token that is used to route a notification message to an identified client application for the user associated with the user token.

FIG. 5B is a flow diagram illustrating one embodiment of a process to generate a user token that is used to route a notification message to an identification client application for the user associated with the user token. Exemplary process 500 may be performed by a processing logic that may comprise hardware (circuitry, dedicated logic, etc.), software (such as is run on a dedicated machine), or a combination of both. For example, process 500 may be performed by some components of system 100 of FIG. 1A (e.g., multi-user client 109. At block 552, the processing logic of process 550 can receive a push notification request. In one embodiment, a notification management module 201 receives the push notification request from a client application 111A or 111B as described above in FIG. 2. In this embodiment, the push notification request can be from a client application from a user. In one embodiment, the push notification request identifies which client application and user is requesting the push notification.

In one embodiment, the push notification request can include one or more of the following: a device token, a user token, and/or a user certificate. For example and in one embodiment, the device token is device token 115 that identifies the device to the push notification system and the user token is the user token 116A that is used to identify the user to the push notification system and can include an alias for that user as described in FIGS. 1A-2 above.

At block 554, process 500 determines if there is a certificate included in the request. In one embodiment, the certificate is a public key certificate that is used to identify the user that is making the request. The certificate can be one based on a user identify (Apple ID, MobileMe ID, some other certificate as known in the art, etc.). If no certificate is included in the request, at block 556, process 550 generates the certificate. In one embodiment, process 500 generates the certificate by retrieving the certificate from a third party certificate generation service. In one embodiment, an appropriate certificate authority signs the certificate. In one embodiment, the certificate is used to generate the alias for the user (e.g., the alias 136 that is part of the user token 116A as described above in FIG. 1).

If the certificate is included in the push notification request, process 550 connects to the push notification system at block 558. In one embodiment, process 550 transmits a push notification connect command to the notification server 105. By transmitting the push notification connect, process 550 signals to the notification system that process 550 is ready to receive notifications for the user and the client application associated with the user.

At block 560, process 560 retrieves and stores the device token from the push notification system. In one embodiment, process 500 retrieves the device token from the notification server 105 and stores the device token in the subscription profile 203 as described above in FIG. 2. In one embodiment, the device token is created upon the initial instance of the multi-user device 109 connecting to the notification server 105.

Process 550 determines if the user token is included in the push notification request at block 562. In one embodiment, if a user token is available for a push notification request, the requesting process inserts the user token into the push notification request, such as user token 116A as described in FIG. 1B. If the user token is not included in the push notification request, process 550 fetches the user token at block 564. In one embodiment, process 550 transmits a push notification connect presence command to the notification server to fetch the user token. In response, the notification server transmits to the requesting process (e.g., process 550) the appropriate user token (e.g., user token 116A). In this embodiment, the connect presence command signals to the push notification server that the device and the user associated with the device is online and ready to receive push notifications. In one embodiment, process 550 transmits the push notification connect presence command upon a user logging into the multi-user device or the multi-user device booting up for a one-user device or a multi-user device with a default user. If the user token is included in the request, process 550 enables the user token at block 566. In one embodiment, process 550 enables the user token when the token is created.

Figure 6:
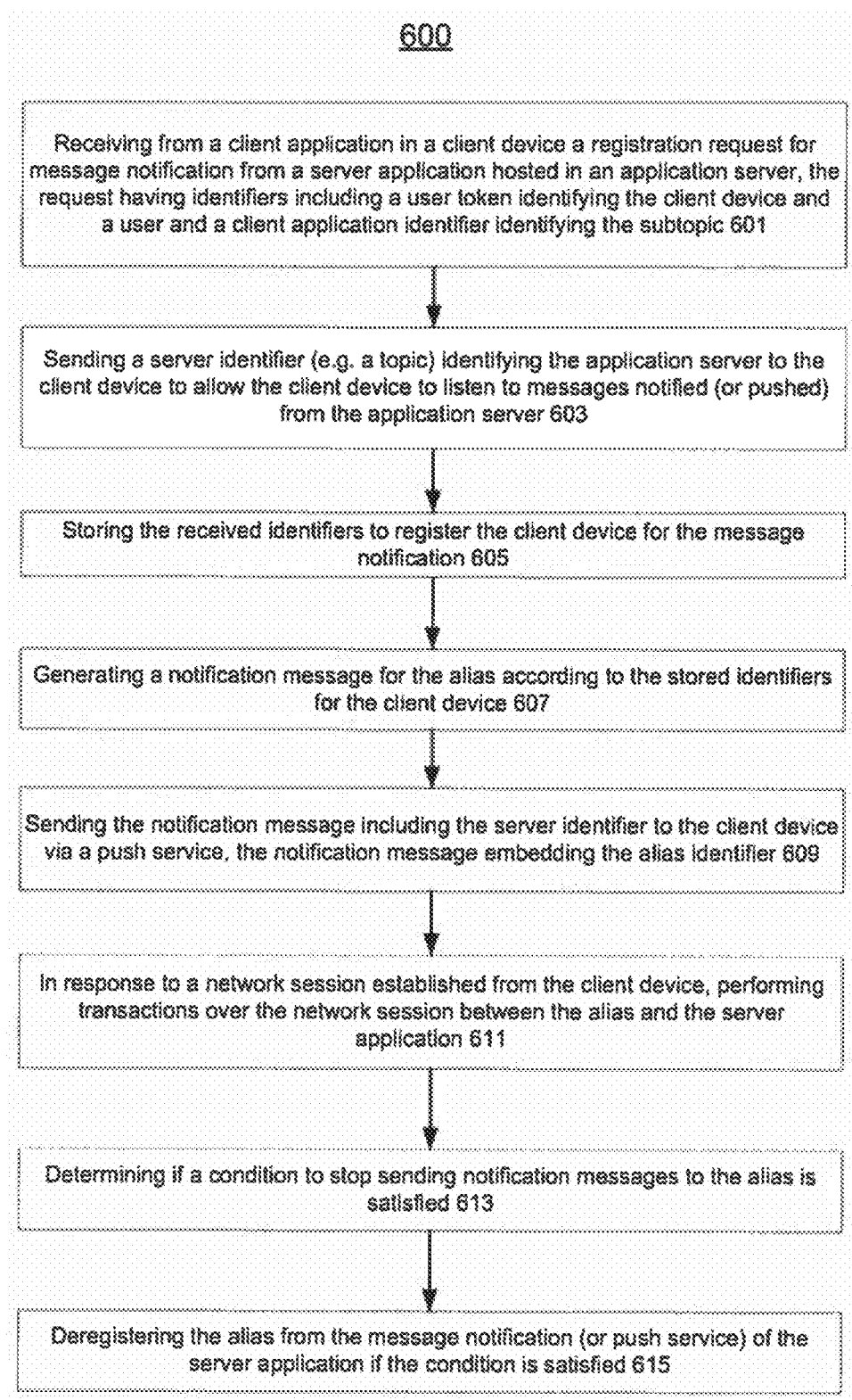
FIG. 6 is a flow diagram illustrating one embodiment of a process to provide notification messages from an application server to an application client.

FIG. 6 is a flow diagram illustrating one embodiment of a process to provide notification messages from an application server to an application client. Exemplary process 600 may be performed by a processing logic that may comprise hardware (circuitry, dedicated logic, etc.), software (such as is run on a dedicated machine), or a combination of both. For example, process 600 may be performed by some components of system 100, such application server 101 in FIG. 1. At block 601, the processing logic of process 600 can receive a registration request from a client application in a client device for message notification from a server application hosted in an application server. The registration request may include an identifier for the client device and/or user (e.g. a user token) and optionally an additional identifier for the client application (e.g. a subtopic).

At block 603, the processing logic of process 600 may send a server identifier (e.g. a topic) that identifies an application server to a client device to allow the client device to listen to messages notified (or pushed) from the application server. In one embodiment, the processing logic of process 600 may store the identifiers including a device identifier and alias for a push service to address a notification message for the client device at block 605. For example and in one embodiment, the server may store the device identifier and the corresponding alias in an identifier list, such as identifier list 300 as described in FIG. 3 above. The stored identifiers may include a subtopic to identify a client application in the client device for receiving the notification message.

In one embodiment, at block 607, the processing logic of process 600 may generate a notification message for a client application registered for receiving the message according to stored identifiers for a user of a client device hosting the client application. For example, the notification message may indicate an occurrence of an event in a server application related to an account associated with the client application, such as the arrival of new mail messages, a chat request, a schedule update, or other applicable events. The notification message may be packaged with a user token identifying the client device and the user to receive the notification message and a payload including a subtopic identifying the client application. At block 609, the processing logic of process 600 may send the notification message including a topic identifying an originating application server to the client device via a push service. The notification message may carry the subtopic embedded in a payload of the message for identifying the client application. Subsequently at block 611, the processing logic of process 600 may perform application specific transactions over a network session established from the client application with the server application.

At block 613, the processing logic of process 600 may determine if a condition to stop sending notification messages to a client application, user, and/or a client device is satisfied. The client application for the user may have registered for receiving the notification messages from a server application. In one embodiment, the processing logic of process 600 may monitor a duration or elapse time for the user and/or the client device since sending a latest notification message to the client device. If the duration exceeds a threshold (e.g. one day, 12 hours, etc., which may be preconfigured or dynamically configured), the condition to stop sending notification messages to the user and/or the client device may be satisfied. At block 615, the processing logic of process 600 may de-register the user and/or the client device from the message notification (or push service) of the server application if the condition is satisfied. In one embodiment, the user may be removed from a list of notification recipients for the server application. For example and in one embodiment, the processing logic of process 600 may remove entries associated with the alias identifying the user, including data carrying a subtopic identifying the client application of the client device, from a registry for message notification. In another embodiment, the client device may be removed from a list of notification recipients for the server application. For example, the processing logic of process 600 may remove entries associated with a device token identifying the client device, including data carrying a subtopic identifying the client application of the client device, from a registry for message notification. In this embodiment, by de-registering the client device, the user(s) associated with the client device are de-registered as well.

Figure 7:
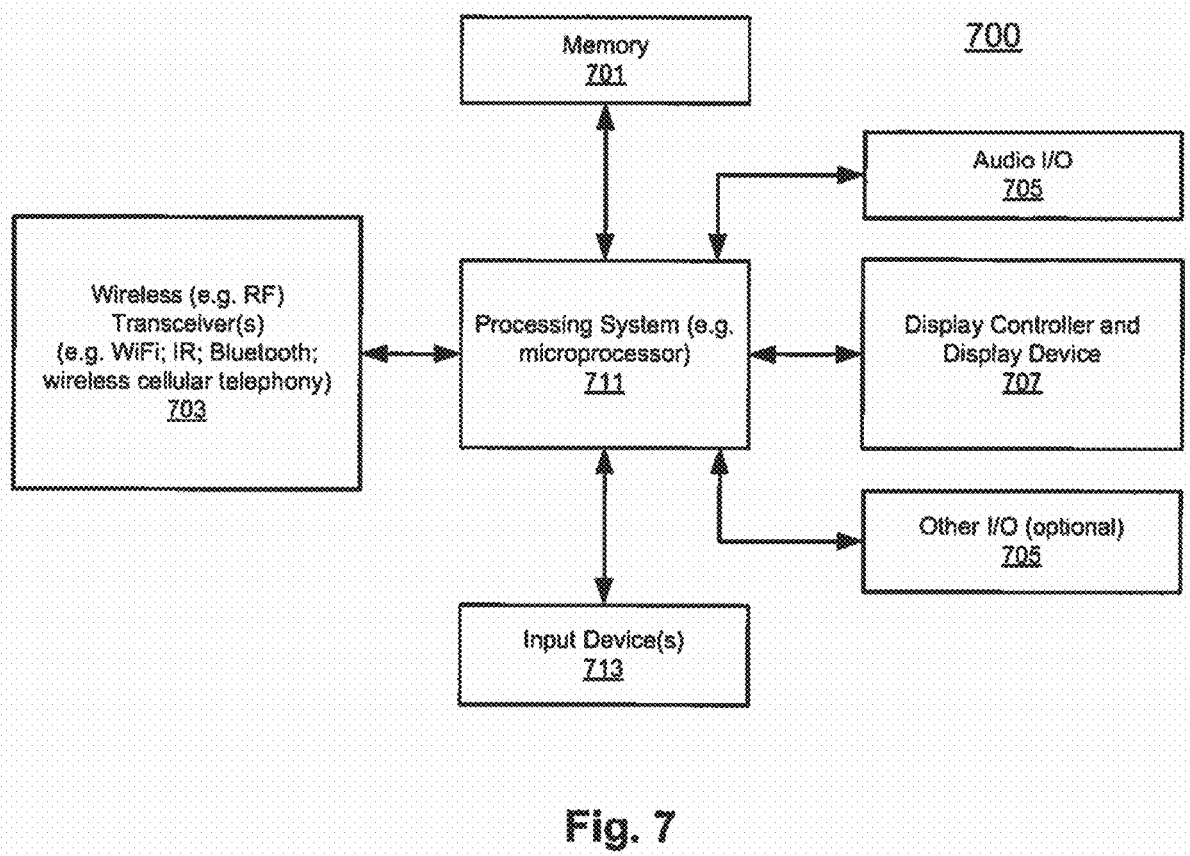
FIG. 7 shows one example of a data processing system which may be used with the embodiments described herein.

FIG. 7 shows one example of a data processing system which may be used with the embodiments described herein. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705 which may include a microphone and a speaker for, for example, playing back music or providing telephone functionality through the speaker and microphone. The system 700 can, in at least certain embodiments, request the one or more profiles described herein and download those profiles to configure the device for communication through a network. The system 700 can download those profiles from a server data processing system which may be the system shown in FIG. 7. In one embodiment, the system 700 may be the device 111A-B shown in FIG. 1.

A display controller and display device 707 provide a visual user interface for the user; this digital interface may include a graphical user interface which is similar to that shown on a Macintosh computer when running OS X operating system software. The system 700 also includes one or more wireless transceivers 703 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system.

The data processing system 700 also includes one or more input devices 713, which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 700 may be a network computer or an embedded processing device within another device, or other types of data processing systems which have fewer components or perhaps more components than that shown in FIG. 7.

Figure 8:
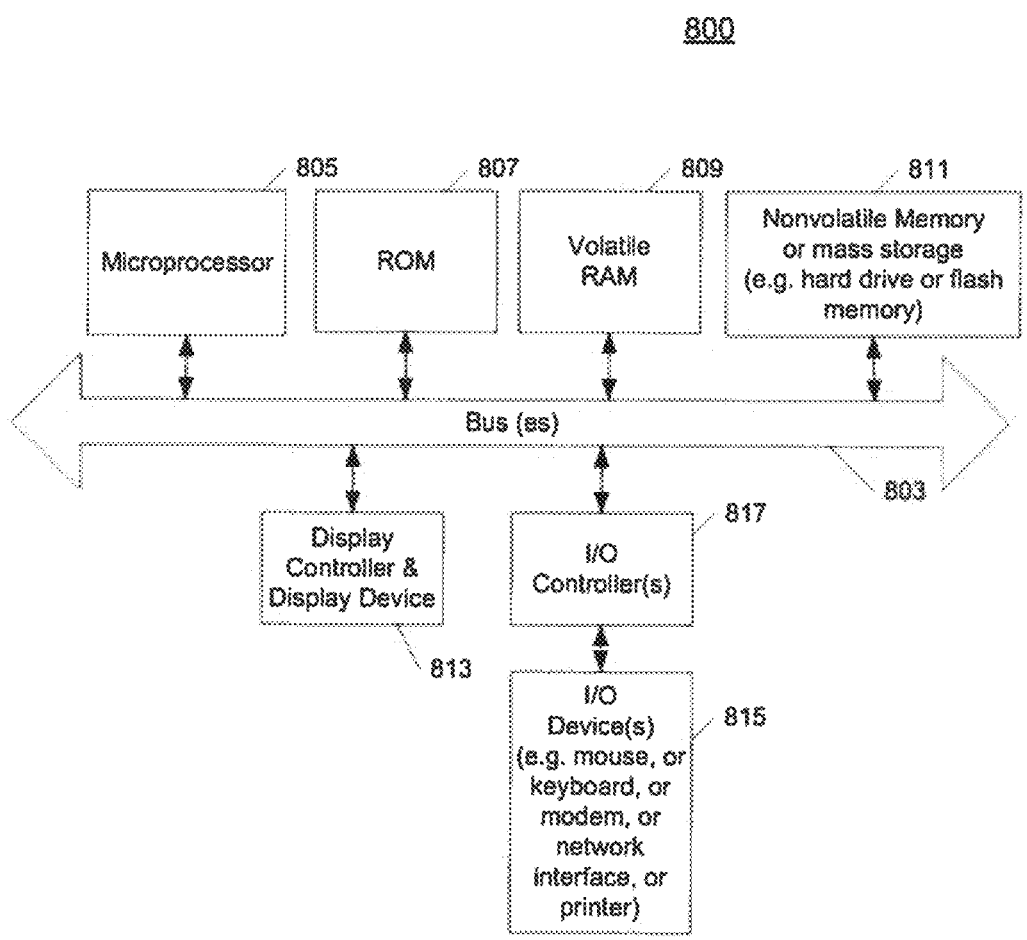
FIG. 8 illustrates an example of a typical computer system which may be used in conjunction with the embodiments described herein.

FIG. 8 shows one example of a data processing system, which may be used with one embodiment of the present invention. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. FIG. 8 may represent the server system shown in FIG. 1.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for multi-user message notification, the method comprising:

hosting a plurality of operating system user accounts on a client device with an operating system that authenticates each of the plurality of operating system user accounts, wherein each of the plurality of operating system user accounts is an account that is used by a user to log into the client device and to customize the client device for a user corresponding to the account;

generating an alias for each of the plurality of operating system user accounts, wherein a plurality of client applications are hosted in the client device and a subtopic identifier uniquely identifying the client application among the plurality of client applications;

in response to receiving a notification message from an application server registered with client device for one of the plurality of aliases, determining if the notification message carries a user token and the subtopic identifier of the client application, wherein the user token includes that alias and a client device identification; and forwarding the notification message to the client application for the corresponding user account using the user token and the subtopic identifier without forwarding the notification message to other applications in the client device if the notification message carries the identifier for the client application.

2. The method of claim 1, wherein an alias is derived from a certificate associated with the corresponding user account.

3. The method of claim 1, wherein the application server is uniquely identified by a topic identifier and further comprising:
registering the client application for the topic identifier to listen to notifications from the application server, wherein more than one of the client applications are registered for the topic identifier.

4. The method of claim 1, wherein the determination comprises:
extracting the alias and the topic identifier from the notification message; and
forwarding the notification message to each client application and corresponding user registered for the topic string if the notification message does not carry the subtopic identifier.

5. The method of claim 1, wherein the forwarding comprises invoking the client application if the client application is not currently active.

6. The method of claim 1, wherein the operating system account is an account used to customize specific system settings for a user selected from the group consisting of a file system environment, desktop settings, and application settings.

7. The method of claim 1, wherein the user token further includes zone information, wherein the zone information an identifier that associates the user to a particular zone of a notification system.

8. A non-transitory machine-readable medium having instructions, when executed by a machine, cause the machine to perform a method for message notification, the method comprising:
hosting a plurality of operating system user accounts on a client device with an operating system that authenticates each of the plurality of operating system user accounts, wherein each of the plurality of operating system user accounts is an account that is used by a user to log into the client device and to customize the client device for a user corresponding to the account;
generating an alias for each of the plurality of user accounts, wherein a plurality of client applications are hosted in the client device and a subtopic identifier uniquely identifying the client application among the plurality of client applications;
in response to receiving a notification message from an application server registered with client device for one of the plurality of aliases, determining if the notification message carries a user token and the subtopic identifier of the client application, wherein the user token includes that alias and a client device identification; and
forwarding the notification message to the client application for the corresponding user account using the user token and the subtopic identifier without forwarding the notification message to other applications in the client device if the notification message carries the identifier for the client application.

9. The machine-readable medium of claim 8, wherein an alias is derived from a certificate associated with the corresponding user account.

10. The machine-readable medium of claim 8, wherein the application server is uniquely identified by a topic identifier and further comprising:
registering the client application for the topic identifier to listen to notifications from the application server, wherein more than one of the client applications are registered for the topic identifier.

11. The machine-readable medium of claim 8, wherein the determination comprises:
extracting the alias and the topic identifier from the notification message; and
forwarding the notification message to each client application and corresponding user registered for the topic string if the notification message does not carry the subtopic identifier.

12. The machine-readable medium of claim 8, wherein the forwarding comprises invoking the client application if the client application is not currently active.

13. The machine-readable medium of claim 8, wherein the operating system account is an account used to customize specific system settings for a user selected from the group consisting of a file system environment, desktop settings, and application settings.

14. The machine-readable medium of claim 8, wherein the user token further includes zone information, wherein the zone information an identifier that associates the user to a particular zone of a notification system.

15. An apparatus for multi-message notification, the apparatus comprising:
a memory storing executable instructions;
a network interface coupled to a push network; and
a processor coupled to the network interface and the memory to execute the executable instructions from the memory, the processor configured to,
host a plurality of operating system user accounts on a client device with an operating system that authenticates each of the plurality of operating system user accounts, wherein each of the plurality of operating system user accounts is an account that is used by a user to log into the client device and to customize the client device for a user corresponding to the account,
generate an alias for each of the plurality of user accounts, wherein a plurality of client applications are hosted in the client device and a subtopic identifier uniquely identifying the client application among the plurality of client applications,
in response to receiving a notification message from an application server registered with client device for one of the plurality of aliases, determine if the notification message carries a user token and the subtopic identifier of the client application, wherein the user token includes that alias and a client device identification, and
forward the notification message to the client application for the corresponding user account using the user token and the subtopic identifier without forwarding the notification message to other applications in the client device if the notification message carries the identifier for the client application.

16. The apparatus of claim 15, wherein an alias is derived from a certificate associated with the corresponding user account.

17. The apparatus of claim 15, wherein the application server is uniquely identified by a topic identifier and further comprising:
   registering the client application for the topic identifier to listen to notifications from the application server, wherein more than one of the client applications are registered for the topic identifier.

18. The apparatus of claim 15, wherein the determination comprises:
   extracting the alias and the topic identifier from the notification message; and
   forwarding the notification message to each client application and corresponding user registered for the topic string if the notification message does not carry the subtopic identifier.

19. The apparatus of claim 15, wherein the operating system account is an account used to customize specific system settings for a user selected from the group consisting of a file system environment, desktop settings, and application settings.

20. The apparatus of claim 15, wherein the user token further includes zone information, wherein the zone information an identifier that associates the user to a particular zone of a notification system.

* * * * *